US012476387B2

(12) United States Patent
Yi et al.

(10) Patent No.: US 12,476,387 B2
(45) Date of Patent: Nov. 18, 2025

(54) ANTENNA SUBSTRATE AND ELECTRONIC DEVICE INCLUDING THE SAME

(71) Applicant: SAMSUNG ELECTRO-MECHANICS CO., LTD., Suwon-si (KR)

(72) Inventors: Moon Hee Yi, Suwon-si (KR); Hae Kyo Seo, Suwon-si (KR); Yong Hoon Kim, Suwon-si (KR); Seung Eun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 816 days.

(21) Appl. No.: 17/718,708

(22) Filed: Apr. 12, 2022

(65) Prior Publication Data

US 2023/0178902 A1 Jun. 8, 2023

(30) Foreign Application Priority Data

Dec. 3, 2021 (KR) ........................ 10-2021-0171810

(51) Int. Cl.

*H01Q 21/08* (2006.01)
*H01Q 1/24* (2006.01)
*H01Q 1/48* (2006.01)
*H01Q 9/04* (2006.01)

(52) U.S. Cl.

CPC ............. *H01Q 21/08* (2013.01); *H01Q 1/243* (2013.01); *H01Q 1/48* (2013.01); *H01Q 9/0407* (2013.01)

(58) Field of Classification Search

CPC .......... H01Q 21/08; H01Q 1/243; H01Q 1/48; H01Q 9/0407

USPC .......................................................... 455/211

See application file for complete search history.

(56) References Cited

U.S. PATENT DOCUMENTS

| | | | | |
|---|---|---|---|---|
| 2004/0212536 A1* | 10/2004 | Mori | ...................... | H01Q 1/243<br>343/700 MS |
| 2019/0173176 A1* | 6/2019 | Kim | ...................... | H01Q 21/062 |
| 2019/0198976 A1* | 6/2019 | Kim | ...................... | H01Q 21/062 |
| 2019/0207304 A1* | 7/2019 | Kim | ...................... | H01L 24/25 |
| 2019/0229426 A1* | 7/2019 | Kim | ...................... | H01Q 1/48 |
| 2019/0273320 A1* | 9/2019 | Kim | ...................... | H01Q 21/065 |
| 2019/0280385 A1* | 9/2019 | Suematsu | .............. | H01Q 21/24 |

(Continued)

FOREIGN PATENT DOCUMENTS

| | | |
|---|---|---|
| JP | 6809600 B2 | 1/2021 |
| KR | 10-2020-0097621 A | 8/2020 |

*Primary Examiner* — April G Gonzales

(74) *Attorney, Agent, or Firm* — MORGAN, LEWIS & BOCKIUS LLP

(57) ABSTRACT

An antenna substrate includes a skin layer containing an insulating material, a ground layer containing a conductive material, an insulating layer disposed between the skin layer and the ground layer and including an insulating material different from the insulating material of the skin layer, a plurality of patch antennas disposed between the ground layer and the skin layer, a shielding member disposed between the ground layer and the skin layer, spaced apart from the plurality of patch antennas, and connected to the ground layer, and a shielding post connected to the shielding member, and protruding further than an outer surface of the skin layer, from the shielding member in a direction facing the skin layer, at least a portion of the shielding post being disposed between the plurality of patch antennas.

21 Claims, 9 Drawing Sheets

(56) References Cited

U.S. PATENT DOCUMENTS

| | | | | |
|---|---|---|---|---|
| 2020/0035626 | A1* | 1/2020 | Ueda | H01L 23/552 |
| 2020/0163204 | A1* | 5/2020 | Kim | H01Q 1/44 |
| 2020/0176877 | A1* | 6/2020 | Kim | H01Q 21/24 |
| 2020/0220268 | A1* | 7/2020 | Kim | H01Q 9/26 |
| 2020/0259269 | A1* | 8/2020 | Kim | H01Q 1/521 |
| 2020/0303839 | A1* | 9/2020 | Kim | H01Q 1/2283 |
| 2020/0365969 | A1* | 11/2020 | Lee | H01Q 21/06 |
| 2020/0381804 | A1* | 12/2020 | Park | H01Q 9/16 |
| 2020/0395677 | A1* | 12/2020 | Kim | H01Q 21/245 |
| 2020/0395679 | A1* | 12/2020 | Lim | H01Q 21/0025 |
| 2020/0411991 | A1* | 12/2020 | Park | H01Q 21/0025 |
| 2021/0044001 | A1* | 2/2021 | Kang | H01L 23/13 |
| 2021/0135378 | A1* | 5/2021 | Cho | H01Q 1/2283 |
| 2022/0077566 | A1* | 3/2022 | Jo | H01Q 21/08 |

* cited by examiner

ANTENNA SUBSTRATE AND ELECTRONIC DEVICE INCLUDING THE SAME

CROSS-REFERENCE TO RELATED APPLICATION

This application claims the benefit under 35 USC 119 (a) of Korean Patent Application No. 10-2021-0171810 filed on Dec. 3, 2021 in the Korean Intellectual Property Office, the entire disclosure of which is incorporated herein by reference for all purposes.

TECHNICAL FIELD

The present disclosure relates to an antenna substrate and an electronic device including the same.

BACKGROUND

Mobile communications data traffic is rapidly increasing every year. Active technological development is in progress to support such breakthrough data in real time in the wireless network. For example, Applications such as contentization of Internet of Things (IoT)-based data, Augmented Reality (AR), Virtual Reality (VR), live VR/AR combined with SNS, autonomous driving, Sync View (Real-time video transmission from user's point of view using a miniature camera) require communication standards (e.g., 5G communication, mmWave communication, etc.) that support sending and receiving large amounts of data.

Since data capacity may be efficiently increased as the frequency of the communication signal increases, the frequency of the communication signal gradually increases and the wavelength of the communication signal gradually decreases. Therefore, the wavelength of communication standard (e.g., 5G communication, mmWave communication, etc.) that supports sending and receiving large amounts of data may also be short. Since the attenuation rate of a communications signal in the atmosphere may be inversely proportional to the square of the wavelength, the gain and/or maximum power of an antenna for remote transmitting and receiving a communication signal of a short wavelength may be highly required in consideration of the large attenuation of the communications signal in the atmosphere.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide an antenna substrate and an electronic device including the same.

According to an aspect of the present disclosure, an antenna substrate includes a skin layer containing an insulating material; a ground layer containing a conductive material; an insulating layer disposed between the skin layer and the ground layer and including an insulating material different from the insulating material of the skin layer; a plurality of patch antennas disposed between the ground layer and the skin layer; a shielding member disposed between the ground layer and the skin layer, spaced apart from the plurality of patch antennas, and connected to the ground layer; and a shielding post connected to the shielding member, and protruding further than an outer surface of the skin layer, from the shielding member in a direction facing the skin layer, at least a portion of the shielding post being disposed between the plurality of patch antennas.

According to an aspect of the present disclosure, an antenna substrate includes a ground layer containing a conductive material; a plurality of patch antennas disposed above the ground layer; a shielding member spaced apart from the plurality of patch antennas, connected to the ground layer, and extending upwardly from the ground layer; and a shielding post protruding upwardly from the shielding member. In a direction in which the plurality of patch antennas face each other, a distance between the shielding post and the plurality of patch antennas is shorter than a length of each of the plurality of patch antennas, and a distance between an upper surface of the shielding post and an upper surface of the ground layer is greater than a distance between upper surfaces of the plurality of patch antennas and the upper surface of the ground layer.

According to an aspect of the present disclosure, an electronic device includes the antenna substrate described above, and a radio frequency integrated circuit (RFIC) inputting or outputting a radio frequency (RF) signal to a plurality of patch antennas of the antenna substrate.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1A:
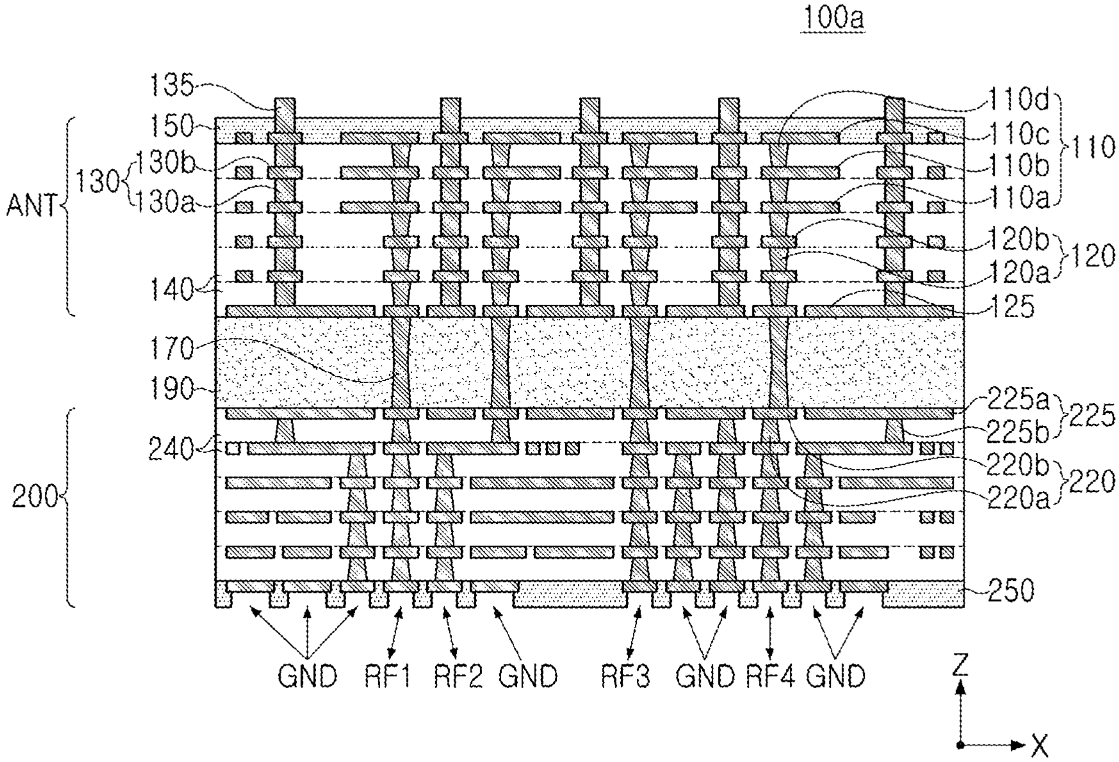
FIGS. 1A to 1D are cross-sectional views illustrating antenna substrates according to embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

FIGS. 1A to 1D are cross-sectional views illustrating antenna substrates according to embodiments.

Referring to FIGS. 1A to 1D, an antenna substrate (100*a*, 100*b*, 100*c*, 100*d*) according to an embodiment may include at least one of an antenna portion ANT, a core insulating layer 190, and a connection portion 200. For example, the antenna substrates 100*a*, 100*b*, 100*c*, and 100*d* may be implemented as printed circuit boards, and alternatively, the printed circuit board may be a coreless printed circuit board in which the core insulating layer 190 is omitted, and may alternatively be a printed circuit board in which the antenna portion ANT and the connection portion 200 are implemented independently of each other and coupled. Accordingly, the core insulating layer 190 and/or the connection portion 200 may be omitted according to design.

Referring to FIGS. 1A to 1D, the antenna portion ANT of the antenna substrate (100*a*, 100*b*, 100*c*, 100*d*) according to an embodiment may include at least a portion of a skin layer 150, a ground layer 125, and an insulating layer 140, a plurality of feed vias 120, a plurality of patch antennas 110, a shielding member 130, and a shielding post 135.

The skin layer 150 may contain an insulating material. For example, the skin layer 150 may be a solder resist layer laminated on an uppermost layer and/or a lowermost layer of the printed circuit board, and thus, the insulating material of the skin layer 150 (e.g., the photocurable resin contains an additional inorganic filler) may be closer to photosensitivity than an insulating material (e.g., prepreg) of the insulating layer 140. For example, that the insulating material of the skin layer 150 is relatively closer to photosensitivity may be defined as the degree of curing being changed greatly according to a unit time of exposure to light and/or heat. Depending on the design, since an encapsulant may be filled on the upper surface of the skin layer 150, the skin layer 150 is not limited to being exposed to atmosphere.

The ground layer 125 may include a conductive material (e.g., copper (Cu), silver (Ag), palladium (Pd), aluminum (Al), nickel (Ni), titanium (Ti), gold (Au), platinum (Pt), or a combination thereof). For example, the ground layer 125 may have a shape occupying most of the area of at least one conductive layer of the printed circuit board, and may stably provide an electrical ground state. For example, the at least one conductive layer may be implemented using a semi-additive process (SAP), a modified semi-additive process (MSAP), or a subtractive method.

Figure 1B:
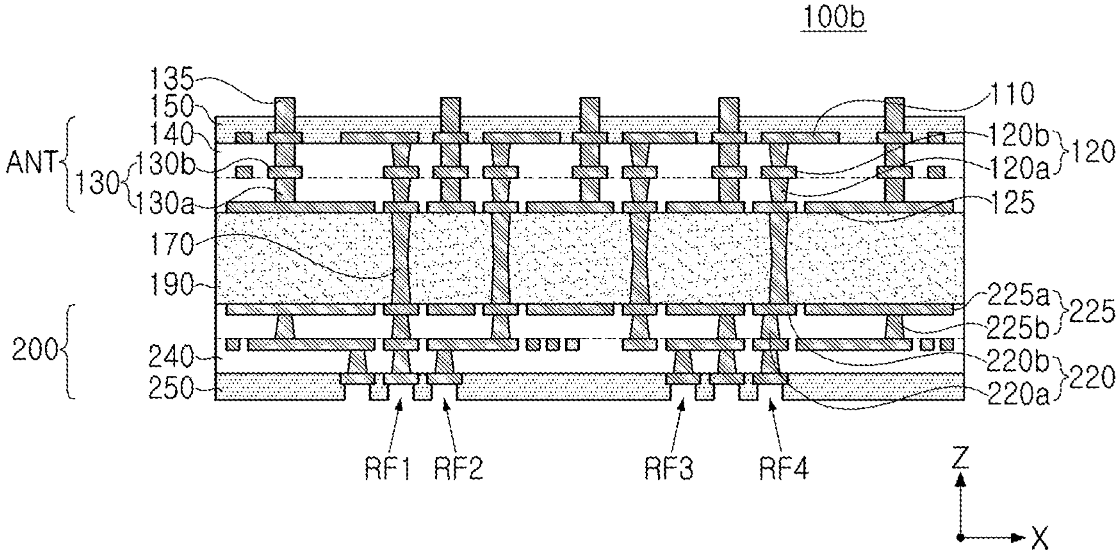

The insulating layer 140 may be disposed between the skin layer 150 and the ground layer 125, and may include an insulating material (e.g., a non-photosensitive insulating material such as prepreg, Ajinomoto build-up film (ABF)) different from the insulating material of the skin layer 150. FIGS. 1A and 1B illustrate a structure in which the number of insulating layers 140 is five and two, respectively, but the number of insulating layers 140 is not limited.

The plurality of feed vias 120 may be disposed to penetrate through the ground layer 125. For example, the plurality of feed vias 120 may have a conductive structure connecting the plurality of conductive layers of the printed circuit board in a direction perpendicular to upper and lower surfaces of the plurality of conductive layers, and may have the same conductive material as the conductive material of the ground layer 125. For example, the plurality of feed vias 120 may include interlayer vias 120*a* vertically connecting the plurality of conductive layers of the printed circuit board, and a land 120*b* between the interlayer vias 120*a*. The ground layer 125 may have a plurality of through-holes through which the plurality of feed vias 120 pass therethrough, and the diameters of the plurality of through-holes may be greater than the diameters of the plurality of feed vias 120. The plurality of feed vias 120 may be spaced apart from the ground layer 125.

Since the plurality of feed vias 120 may be used as a path of a radio frequency (RF) signal and may have a shorter length than a wiring disposed on a plane perpendicular to the vertical direction (e.g., the Z direction), a transmission loss of the RF signal may be effectively reduced, and it may be advantageous to increase a gain and/or a maximum output of the plurality of patch antennas 110. Since power feeding to the plurality of patch antennas 110 may be implemented with wiring, the plurality of feed vias 120 may be omitted according to design.

Alternatively, the number of the plurality of feed vias 120 may be twice or more the number of the plurality of patch antennas 110. For example, the plurality of feed vias 120 are biased in a plurality of horizontal directions (e.g., X and Y directions) perpendicular to each other from the center of the plurality of patch antennas 110 to feed the plurality of patch antennas 110, such that the plurality of patch antennas 110 may respectively transmit and receive a plurality of RF signals having a polarized wave relationship with each other.

The plurality of patch antennas 110 may be configured to be fed from the plurality of feed vias 120, between the ground layer 125 and the skin layer 150. For example, the plurality of patch antennas 110 may be implemented as a plurality of polygonal or circular patterns on at least one conductive layer of the printed circuit board, and may be arranged such that the spacing between the plurality of patch antennas 110 may be constant.

The upper and lower areas of the plurality of patch antennas 110 may be determined according to the frequency of the RF signal, and may decrease as the frequency of the RF signal increases. This is because upper and lower areas of the plurality of patch antennas 110 may correspond to the C element and the L element that determine the resonant frequencies of the plurality of patch antennas 110. The C element and the L element may be affected by a connection relationship and/or arrangement relationship between the plurality of patch antennas 110 and the plurality of feed vias 120. Therefore, when the plurality of patch antennas 110 are fed from the plurality of feed vias 120, not only the plurality of feed vias 120 are directly connected to the plurality of patch antennas 110, but also the plurality of feed vias 120 may be electromagnetically coupled to the plurality of patch antennas 110 in a non-contact state, thereby effectively affecting the C element and the L element. For example, the upper end area of the plurality of feed vias 120 may be wider than the cross-sectional area of the center of the plurality of feed vias 120, and may effectively affect the C element and the L element.

For example, each of the plurality of patch antennas 110 may include a plurality of patch patterns 110*a*, 110*b*, and 110*c* disposed to overlap each other in a direction (e.g., −Z direction) facing the ground layer 125. The plurality of patch patterns 110*a*, 110*b*, and 110*c* may be electromagnetically coupled to each other, and may effectively affect the C element and the L element. At least a portion of the plurality of patch patterns 110*a*, 110*b*, and 110*c* may be connected by a patch via 110*d*, but the patch via 110*d* may be omitted.

Since the RF signal may be more greatly attenuated in atmosphere as the frequency increases, the number of the plurality of patch antennas 110 may increase as the frequency increases, to secure a gain and/or maximum output. The plurality of patch antennas 110 may remotely transmit/receive RF signals in a direction (e.g., Z-direction) perpendicular to the upper and lower surfaces, and the electric and magnetic fields corresponding to the RF signals may be formed in directions perpendicular to the remote transmission/reception direction of the RF signal and perpendicular to each other. The electric and magnetic fields may electromagnetically interfere with adjacent patch antennas of each of the plurality of patch antennas 110, and the gain and/or maximum output of the plurality of patch antennas 110 may be improved by suppression of electromagnetic interference according to the electric and magnetic fields.

The shielding member 130 may be spaced apart from the plurality of patch antennas 110, between the ground layer 125 and the skin layer 150, and may be electrically connected to the ground layer 125. For example, the shielding member 130 may include a plurality of shielding patterns 130*b* and may include a shielding via 130*a* connecting the plurality of shielding patterns 130*b*. The shielding via 130*a* may be formed in the same manner as the interlayer via 120*a*, and the plurality of shielding patterns 130*b* may be formed in positions different from the plurality of patch antennas 110 in a similar manner to a formation method of the plurality of patch antennas 110. Since a lowermost end of the shielding via 130*a* may be positioned at the same height as the upper surface of the ground layer 125, the shielding member 130 may have a shape extending upwardly (e.g., in the +Z direction) from the ground layer 125.

Since the formation method of the shielding member 130 may be similar to the plurality of patch antennas 110 and/or the plurality of feed vias 120, an uppermost surface of the shielding member 130 and an uppermost surface of the plurality of patch antennas 110 may be positioned at the same height as each other. If the uppermost surface of the shielding member 130 is intended to be higher than the uppermost surface of the plurality of patch antennas 110, the number of insulating layers 140 may be further increased, and the increase in the number of the insulating layers 140 may increase the overall size of the antenna substrate and/or increase the possibility of warpage of the antenna substrate.

At least a portion of the shielding post 135 may be disposed between the plurality of patch antennas 110. The shielding post 135 may be connected to the shielding member 130 and may protrude further than the outer surface (e.g., upper surface) of the skin layer 150 in the direction (e.g., the +Z direction) facing the skin layer 150 from the shielding member 130. Alternatively, the distance between the upper surface of the shielding post 135 (or the surface thereof opposite to the surface facing the ground layer 125) and the upper surface of the ground layer 125 may be greater than the distance between the upper surface of the plurality of patch antennas 110 and the upper surface of the ground layer 125. In this case, when each of the plurality of patch antennas 110 includes the plurality of patch patterns 110*a*, 110*b*, and 110*c*, the upper surface of the plurality of patch antennas 110 may be the upper surface of an uppermost patch pattern 110*c* (or the upper surface of the patch pattern 110*c* disposed farthest from the ground layer 125) among the plurality of patch patterns.

Accordingly, even when the insulating layer 140 is not added, the upper surface of the shielding post 135 may be positioned higher than the upper surface of the skin layer 150 and/or the upper surface of the plurality of patch antennas 110. Since at least a portion of the shielding post 135 is disposed between the plurality of patch antennas 110 and is electrically connected to the ground layer 125 through the shielding member 130, the shielding post 135 may reduce the electromagnetic interference between the plurality of patch antennas 110 and may increase the gain and/or maximum output of the plurality of patch antennas 110. In this case, as the upper surface of the shielding post 135 is positioned higher, the shielding post 135 may block electromagnetic interference between the plurality of patch antennas 110 more effectively.

As a result, in the antenna substrates 100*a*, 100*b*, 100*c*, and 100*d* according to embodiments, without increasing the overall size or the possibility of warpage, the gain and/or maximum output of the plurality of patch antennas 110 may be increased.

On the other hand, the connection portion 200 may include at least one of a wiring member 220, a wiring ground member 225, a wiring insulating layer 240, and a wiring skin layer 250. The wiring member 220 may include a wiring layer 220*b* and a wiring via 220*a*, and the wiring ground member 225 may include a wiring ground layer 225*a* and a wiring ground via 225*b*. For example, the connection portion 200 may be implemented as at least a portion of a printed circuit board.

The wiring ground member 225 may provide or receive a ground GND, and the wiring member 220 may provide or receive RF signals RF1, RF2, RF3, and RF4. Accordingly, the wiring layer 220*b* may be electrically connected to the plurality of feed vias 120.

The wiring ground member 225 and the wiring member 220 may be spaced apart from each other, and the wiring ground member 225 may prevent external electromagnetic noise from entering the wiring member 220. The conductive material of the wiring ground member 225 and the wiring member 220 may be the same as the conductive material of the antenna portion ANT. The wiring insulating layer 240 may be implemented in the same manner as the insulating layer 140, and may contain the same insulating material thereas.

The wiring skin layer 250 may provide a path (e.g., a solder ball arrangement space) through which at least one of an integrated circuit (IC), passive components (e.g., capacitor, inductor, filter), and a connector is electrically connected, and may contain the same material as the skin layer 150.

The core insulating layer 190 may be disposed between the wiring layer 220*b* and the ground layer 125, and may have greater solidity than that of the insulating layer 140. Accordingly, the possibility of warpage may be reduced compared to the total number of the insulating layer 140 and the wiring insulating layer 240. For example, the core insulating layer 190 may have relatively stronger solidity by containing at least a portion of the insulating material of the insulating layer 140 and containing an inorganic filler having a composition different from that of the inorganic filler of the insulating layer 140. Alternatively, the core insulating layer 190 may have greater solidity by having a thickness greater than the thickness of each insulating layer 140.

The core insulating layer 190 may provide a path through which the plurality of core vias 170 pass, and the plurality of core vias 170 may be electrically connected between the plurality of feed vias 120 and the wiring layer 220*b*. Alternatively, the plurality of core vias 170 may also be defined as portions of the plurality of feed vias 120.

Referring to FIG. 1B, the number of each of the insulating layers 140 and the wiring insulating layers 240 of the antenna substrate 100*b* according to an embodiment may be smaller than that of FIG. 1A, and a plurality of patch antennas 110 may use only one conductive layer.

Figure 1C:
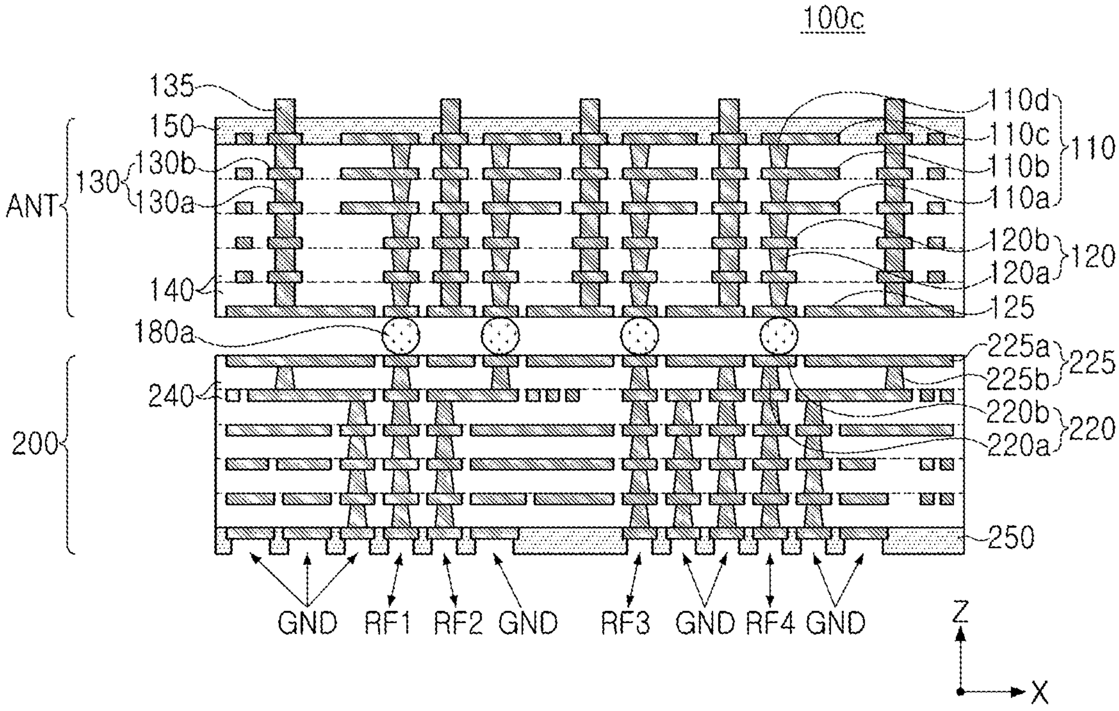

Referring to FIG. 1C, the antenna portion ANT and the connection portion 200 of the antenna substrate 100*c* may be connected to each other through a solder member 180*a*. The solder member 180*a* may be electrically connected between the wiring layer 220*b* and the plurality of feed vias 120 and may include a conductive material (e.g., a tin (Sn)-based or lead (Pb)-based material) having a lower melting point than that of a conductive material (e.g., copper (Cu)) of the shielding post 135. Therefore, the solder member 180*a* in a relatively high fluidity state at a temperature higher than the melting point of the solder member 180*a* may be disposed between the antenna portion ANT and the connection portion 200, and in the case of solder member 180*a*, which is hardened due to a decrease in temperature, the space between the antenna portion ANT and the connection unit 200 may be fixed.

Figure 1D:
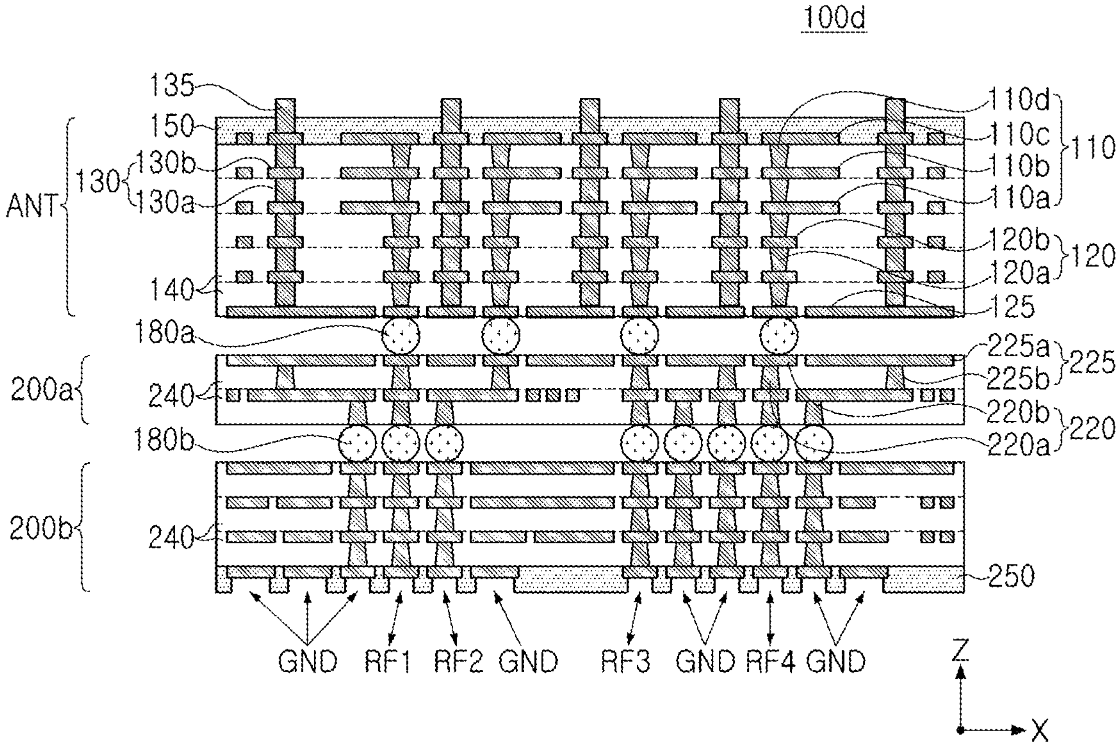

Referring to FIG. 1D, the connection portion 200 of the antenna substrate 100*d* according to an embodiment may be divided into a plurality of connection portions 200*a* and 200*b*, and the plurality of connection portions 200*a* and 200*b* may be connected to each other through a solder member 180*b*.

Figure 2A:
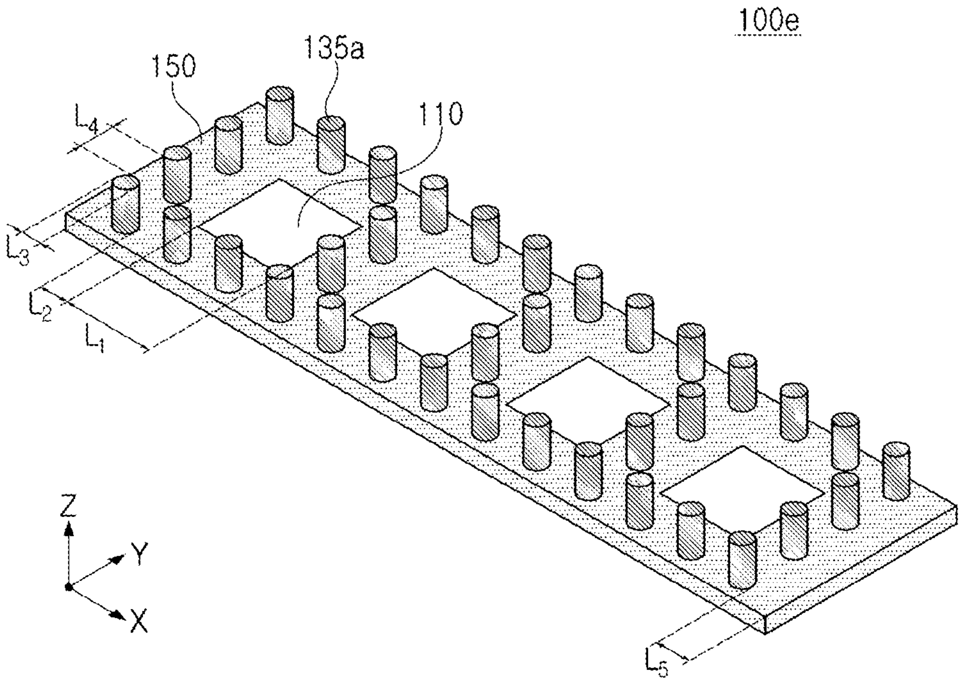
FIGS. 2A and 2B are perspective views illustrating antenna substrates according to embodiments.
Figure 2B:
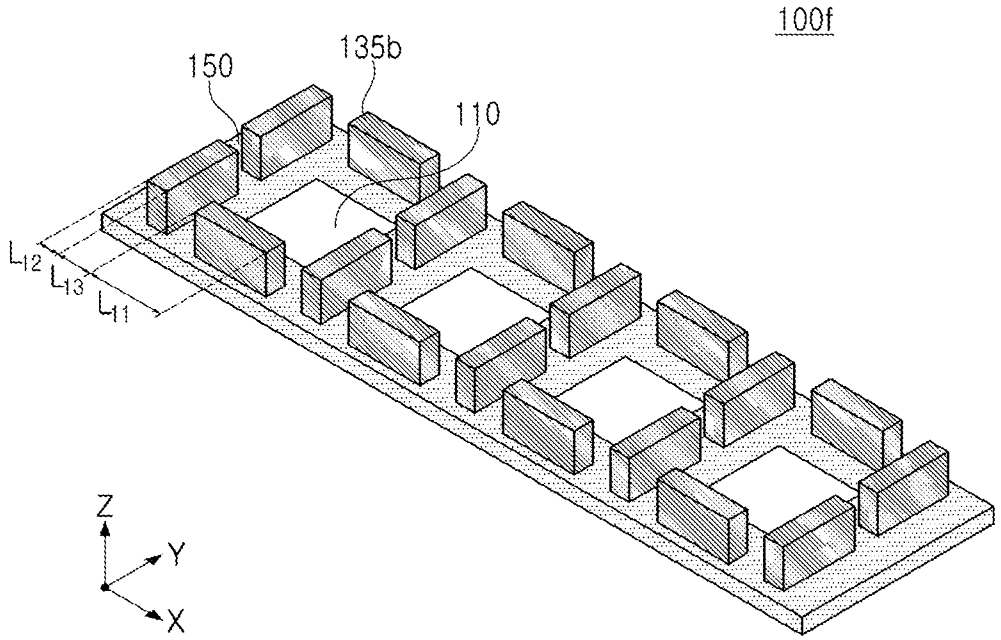

FIGS. 2A and 2B are perspective views illustrating antenna substrates according to embodiments. FIGS. 2A and 2B do not illustrate a structure disposed below the skin layer 150 (e.g., in the −Z direction).

Referring to FIGS. 2A and 2B, shielding posts 135*a* and 135*b* of antenna substrates 100*e* and 100*f* according to embodiments may surround each of the plurality of patch antennas 110, viewed in a direction (e.g., in the Z-direction) in which the plurality of patch antennas 110 and the ground layer face each other. Accordingly, the shielding posts 135*a* and 135*b* may reduce not only electromagnetic interference between the plurality of patch antennas 110 but also an influence of external electromagnetic noise on the plurality of patch antennas 110.

In the direction (e.g., the X direction) in which the plurality of patch antennas 110 face each other, a separation distance $L_2$ between the shielding post 135*a* and the plurality of patch antennas 110 may be shorter than a length $L_1$ of each of the plurality of patch antennas 110. Accordingly, the shielding post 135*a* may have an advantageous structure to prevent electromagnetic interference of the plurality of patch antennas 110 to each other. For example, when the separation distance $L_2$ between the shielding post 135*a* and the plurality of patch antennas 110 is relatively short, the shielding post 135*a* does not significantly affect the separation distance between the plurality of patch antennas 110. Therefore, the design efficiency of the plurality of patch antennas 110 may be secured, and the degree of freedom in the shape of the shielding post 135*a* may be increased.

Referring to FIG. 2A, the shielding post 135*a* may have a structure in which a plurality of cylindrical pillars are arranged, and a diameter $L_3$ of each of the plurality of cylindrical pillars, a gap $L_4$ therebetween, and a separation distance $L_5$ thereof from the edge may be freely adjusted according to the wavelength of the RF signal.

Referring to FIG. 2B, a first width $L_{11}$ of the shielding post 135*b* in a direction (e.g., X direction) in which the plurality of patch antennas 110 face each other may be different from a second width $L_{12}$ perpendicular to the first width. Accordingly, the shielding post 135*a* may more effectively block electromagnetic interference between the plurality of patch antennas 110. A gap $L_{13}$ between the shielding posts 135*a* may also be different from the gap $L_4$ of FIG. 2A.

On the other hand, FIGS. 2A and 2B illustrate that the plurality of patch antennas 110 are arranged in a 1 by 4 structure, but the arrangement structure of the plurality of patch antennas 110 may be modified into, for example, a 2 by 2 structure or a 4 by 4 structure.

Figure 3:
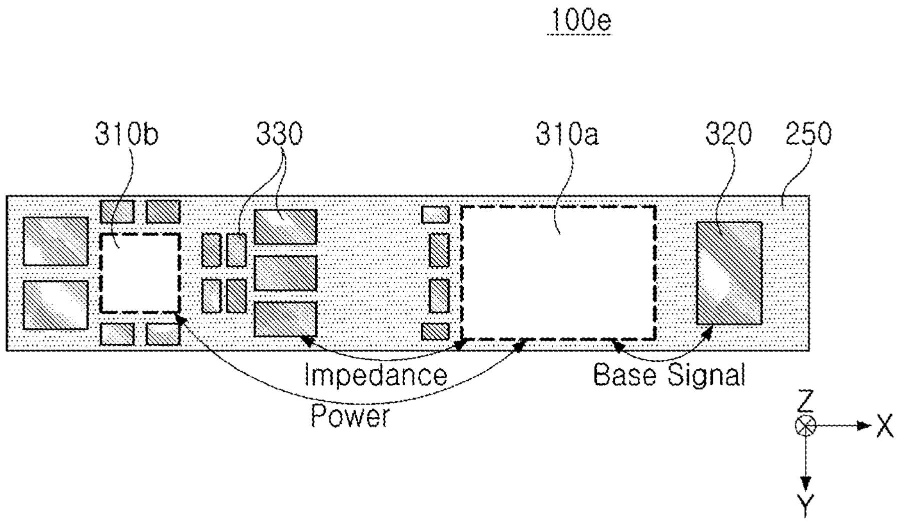
FIG. 3 is a rear view illustrating an antenna substrate according to an embodiment.

FIG. 3 is a rear view illustrating an antenna substrate according to an embodiment.

Referring to FIG. 3, the antenna substrate 100*e* according to an embodiment may further include an RFIC 310*a* inputting or outputting an RF signal to or from a wiring layer (covered by the wiring skin layer 250) and converting the frequency of the RF signal. In this case, the wiring layer (covered by the wiring skin layer 250) may be disposed between the ground layer (covered by the wiring skin layer 250) and the RFIC 310*a*. For example, the RFIC 310*a* may be mounted on at least a portion of the antenna substrate 100*e* through the wiring skin layer 250.

The RFIC 310*a* may receive abase signal from a connector 320 during remote transmission of an RF signal, and may generate an RF signal by increasing the frequency of the base signal, and may generate a base signal by lowering the frequency of the RF signal upon remote reception of the RF signal. Depending on the design, the RFIC 310*a* may perform amplification, phase control, filtering, and switching operations as well as frequency conversion.

For example, the wiring skin layer 250 may further provide a mounting space for at least one of a Power Management Integrated Circuit (PMIC) 310*b*, the connector 320, and a passive component 330 as well as the RFIC 310*a*. For example, the PMIC 310*b* may provide power to the RFIC 310*a*, and the passive component 330 may provide an impedance to the RFIC 310*a*. The impedance may be a portion of an oscillator or mixer that may be used for frequency conversion, may be an input/output impedance of an amplifier, or may be a portion of a DC-DC converter that may be used when generating power of the PMIC 310*b*. The connector 320 may be a portion of a coaxial cable.

Figure 4:
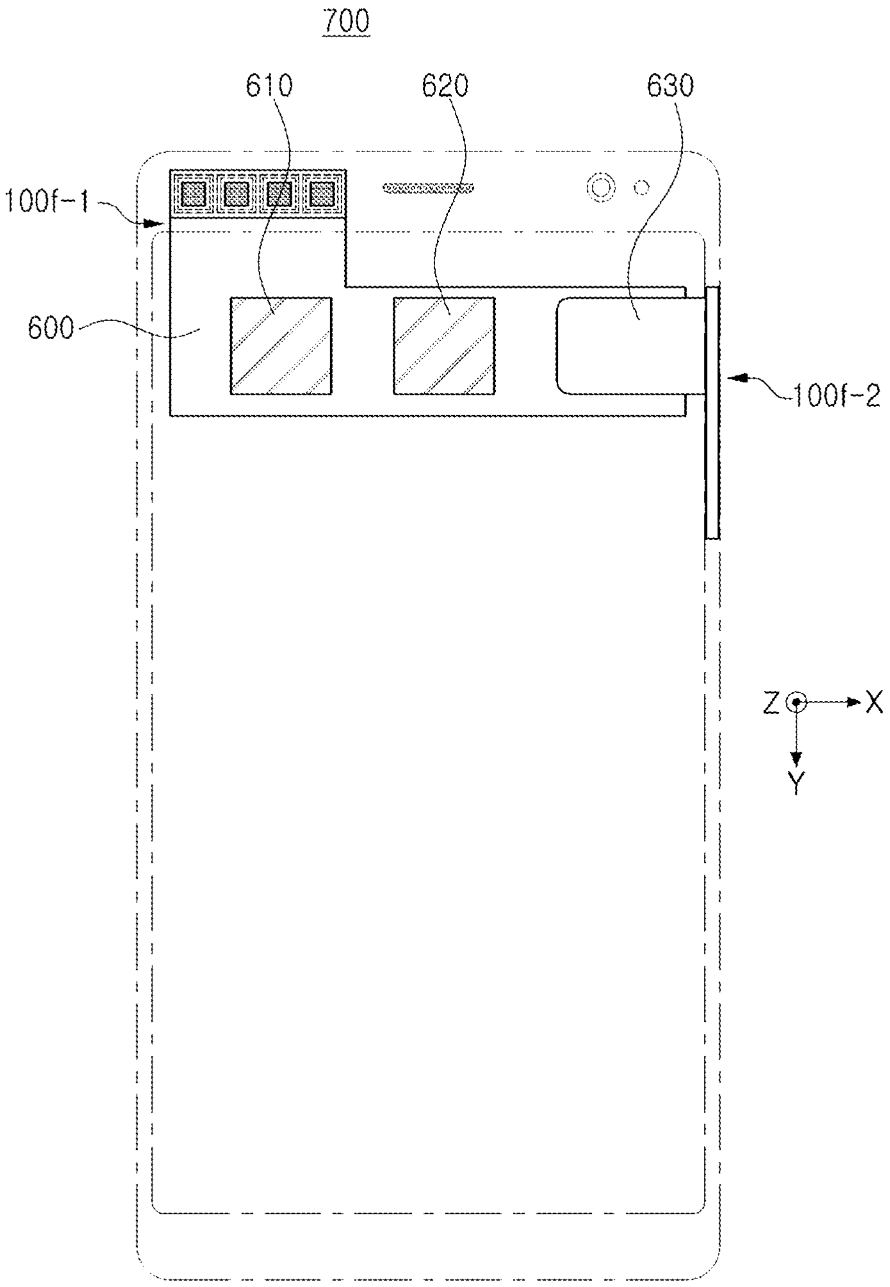
FIG. 4 is a view illustrating an electronic device including an antenna substrate according to an embodiment.

FIG. 4 is a view illustrating an electronic device including an antenna substrate according to an embodiment.

Referring to FIG. 4, antenna substrates 100*f*-1 and 100*f*-2 according to an embodiment may be disposed adjacent to a plurality of different edges of an electronic device 700, respectively.

Examples of the electronic device 700 may include a smartphone, a personal digital assistant, a digital video camera, a digital still camera, a network system, a computer, a monitor, a tablet PC, a laptop computer, a netbook, a television, video game machine, a smart watch, an automotive, and the like, but are not limited thereto.

The electronic device 700 may include a base substrate 600, and the base substrate 600 may further include a communication modem 610 and a baseband IC 620.

The communication modem 610 may include, to perform digital signal processing, at least a portion of a memory chip such as a volatile memory (for example, a dynamic random access memory (DRAM)), a non-volatile memory (for example, a read only memory (ROM)), a flash memory, or the like; an application processor chip such as a central processor (for example, a central processing unit (CPU)), a graphics processor (for example, a graphics processing unit (GPU)), a digital signal processor, a cryptographic processor, a microprocessor, a microcontroller, or the like; and a logic chip such as an analog-to-digital (ADC) converter, an application-specific integrated circuit (ASIC), or the like.

The baseband IC 620 may generate a base signal by performing analog-to-digital conversion, amplification, filtering and frequency conversion on the analog signal. The base signal input and output from the baseband IC 620 may be transmitted to the antenna substrate 100*f*-1 through the coaxial cable, and the coaxial cable may be electrically connected to a connector of the antenna substrate 100*f*-1. Depending on the design, the antenna substrate 100*f*-2 may be connected to the base substrate 600 through a flexible substrate 630.

For example, the frequency of the base signal may be a baseband, and may be a frequency (e.g., several GHz) corresponding to an intermediate frequency (IF). The frequency (e.g., 28 GHz, 39 GHz) of the RF signal may be higher than the IF and may correspond to millimeter wave (mmWave). The RF signals may include a format according to protocols such as wireless fidelity (Wi-Fi) (Institute of Electrical And Electronics Engineers (IEEE) 802.11 family, or the like), worldwide interoperability for microwave access (WiMAX) (IEEE 802.16 family, or the like), IEEE 802.20, long term evolution (LTE), evolution data only (Ev-DO), high speed packet access+ (HSPA+), high speed downlink packet access+ (HSDPA+), high speed uplink packet access+ (HSUPA+), enhanced data GSM environment (EDGE), global system for mobile communications (GSM), global positioning system (GPS), general packet radio service (GPRS), code division multiple access (CDMA), time division multiple access (TDMA), digital enhanced cordless telecommunications (DECT), Bluetooth, 3G, 4G, and 5G protocols, and any other wireless and wired protocols, designated after the abovementioned protocols, but the present disclosure is not limited thereto.

FIGS. 5A to 5G are diagrams illustrating a method of manufacturing an antenna substrate according to an embodiment.

Referring to FIGS. 5A to 5G, an antenna substrate according to an embodiment may be manufactured as the antenna substrate illustrated in FIG. 1A after sequentially passing through first, second, third, fourth, fifth, sixth and seventh operations 100-1, 100-2, 100-3, 100-4, 100-5, 100-6 and 100-7. Since at least a portion of the 1st, 2nd, 3rd, 4th, 5th, 6th and 7th operations (100-1, 100-2, 100-3, 100-4, 100-5, 100-6 and 100-7) may be omitted or modified, the manufacturing method of the antenna substrate illustrated in FIG. 1A is not limited to the manufacturing method illustrated in FIGS. 5A to 5G.

Figure 5A:
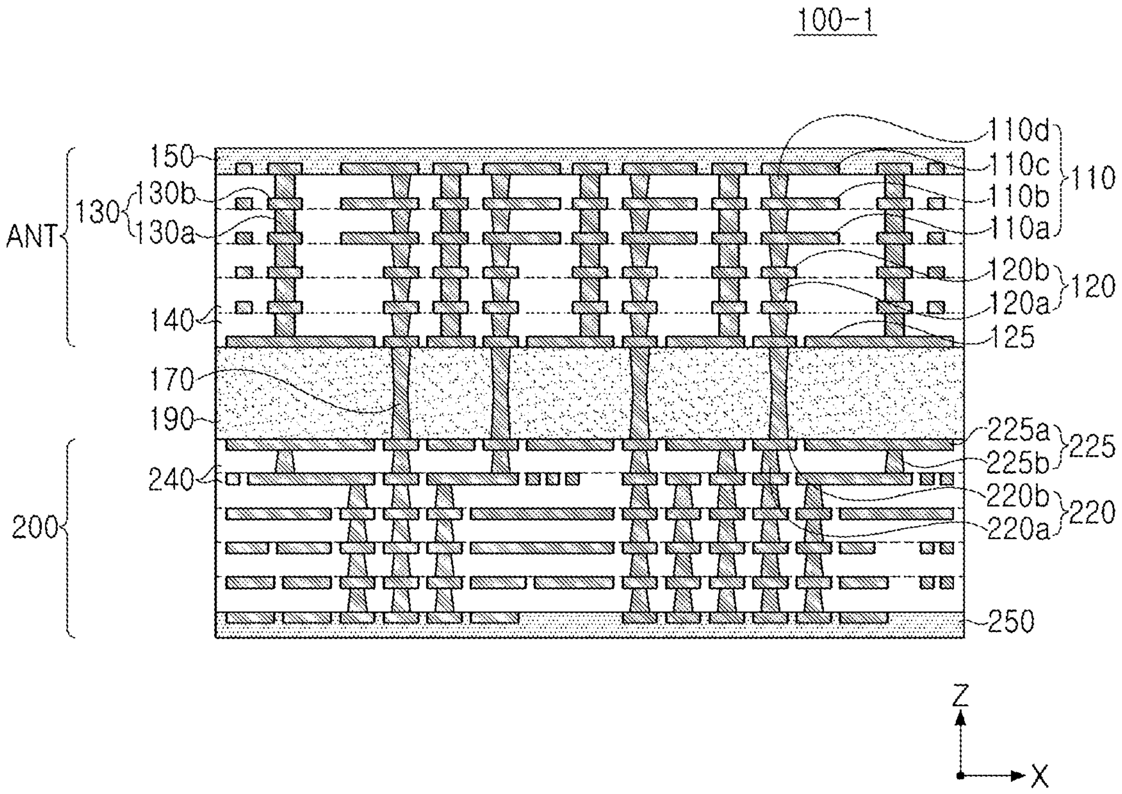
FIGS. 5A to 5G are diagrams illustrating a method of manufacturing an antenna substrate according to an embodiment.

Referring to FIG. 5A, the antenna substrate of the first operation 100-1 may include a structure in which the skin layer 150 and/or the wiring skin layer 250 are formed.

Figure 5B:
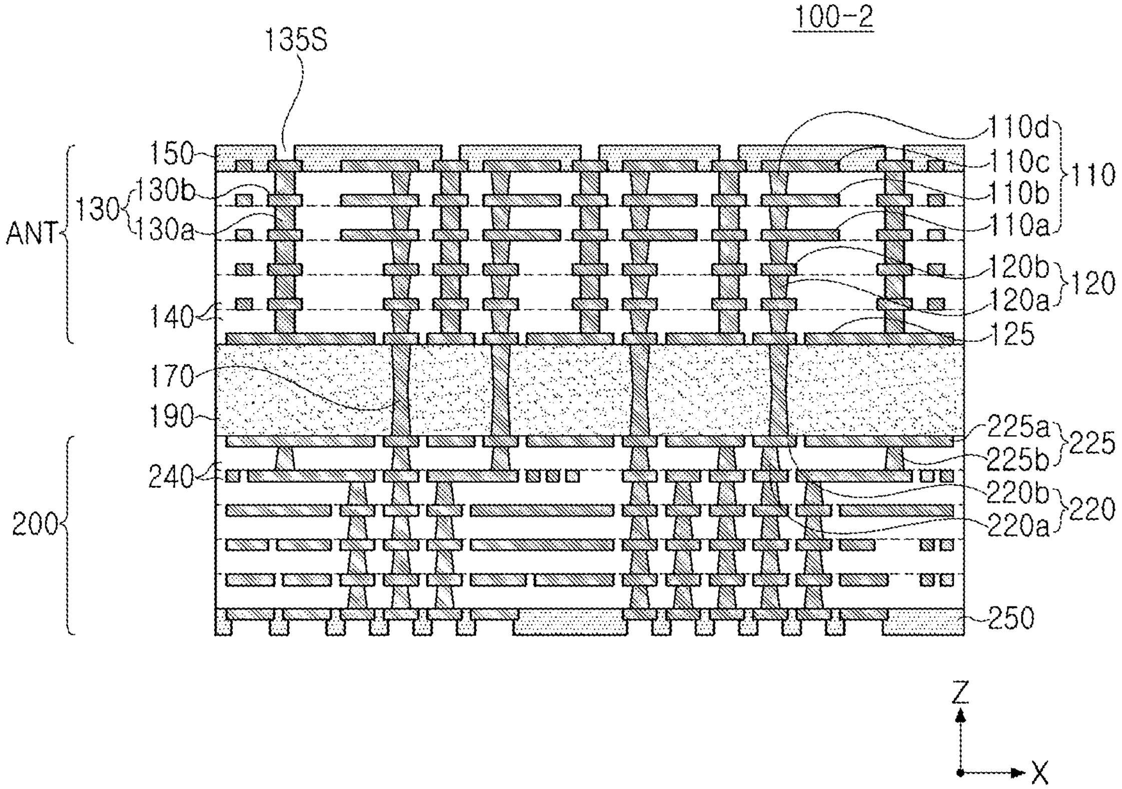

Referring to FIG. 5B, the antenna substrate of the second operation 100-2 may include a structure in which a portion of the skin layer 150 and/or the wiring skin layer 250 is removed. For example, a portion of the skin layer 150 and/or the wiring skin layer 250 may be removed using a photolithography method.

Figure 5C:
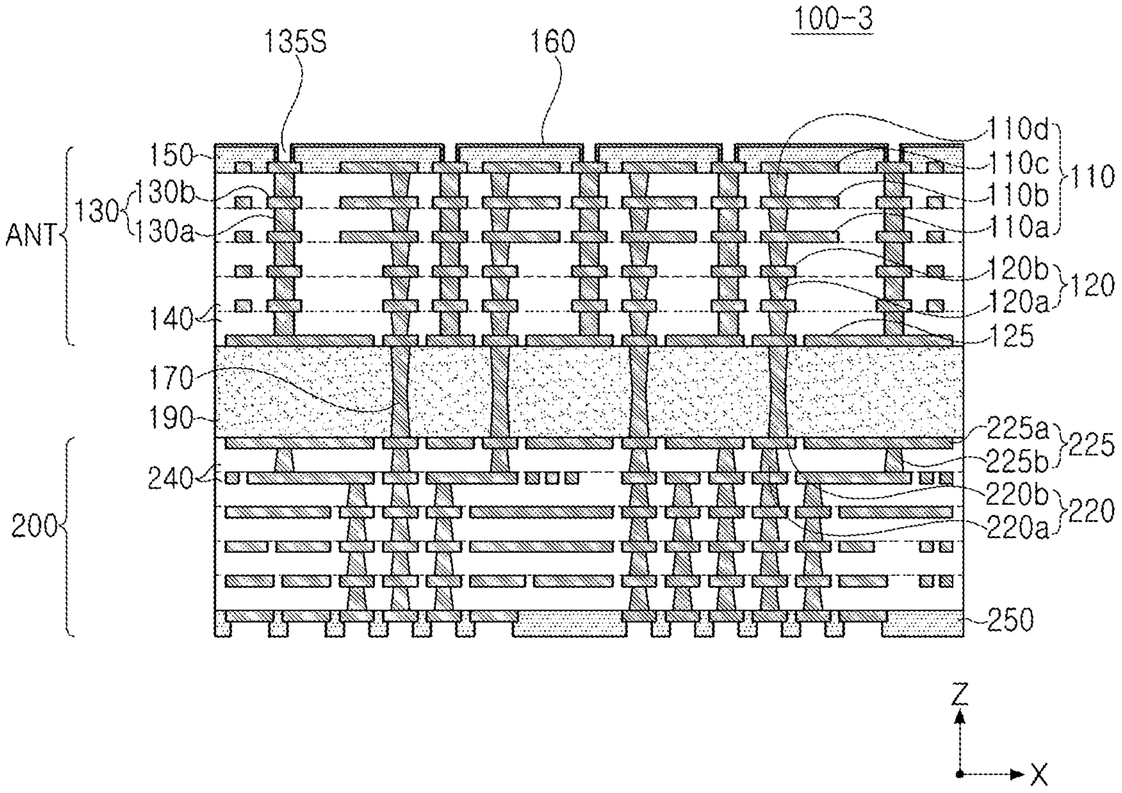

Referring to FIG. 5C, the antenna substrate of the third operation 100-3 may include a structure in which a plating layer 160 is laminated on the outer surface of the skin layer 150. For example, the plating layer 160 may act as a seed in the formation of the shielding post, and may include the same material as the conductive material (e.g., copper (Cu)) of the shielding post.

Figure 5D:
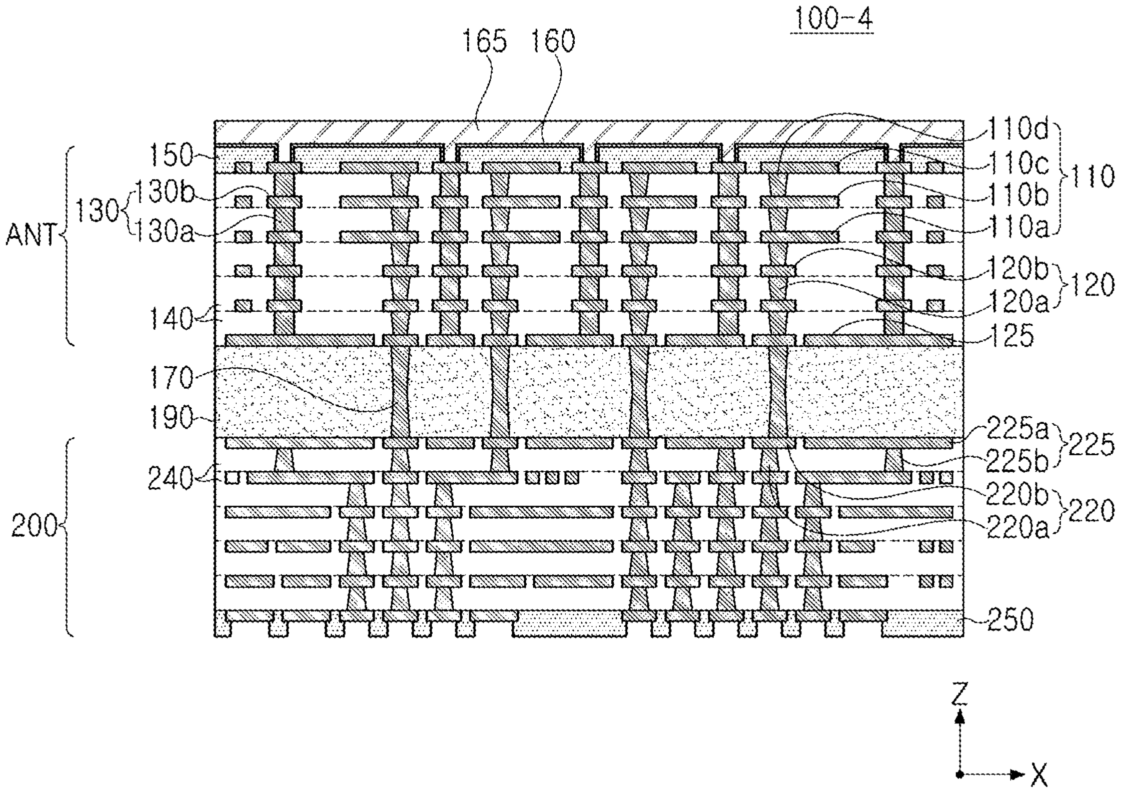

Referring to FIG. 5D, the antenna substrate of the fourth operation 100-4 may include a structure in which a photosensitive film 165 is laminated on the upper surface of the plating layer 160. For example, the photosensitive film 165 may include a lower layer formed on a position on which a portion of the skin layer 150 is removed, and an upper layer formed on the entire upper surface of the antenna substrate, and the lower layer and the upper layer may be sequentially formed.

Figure 5E:
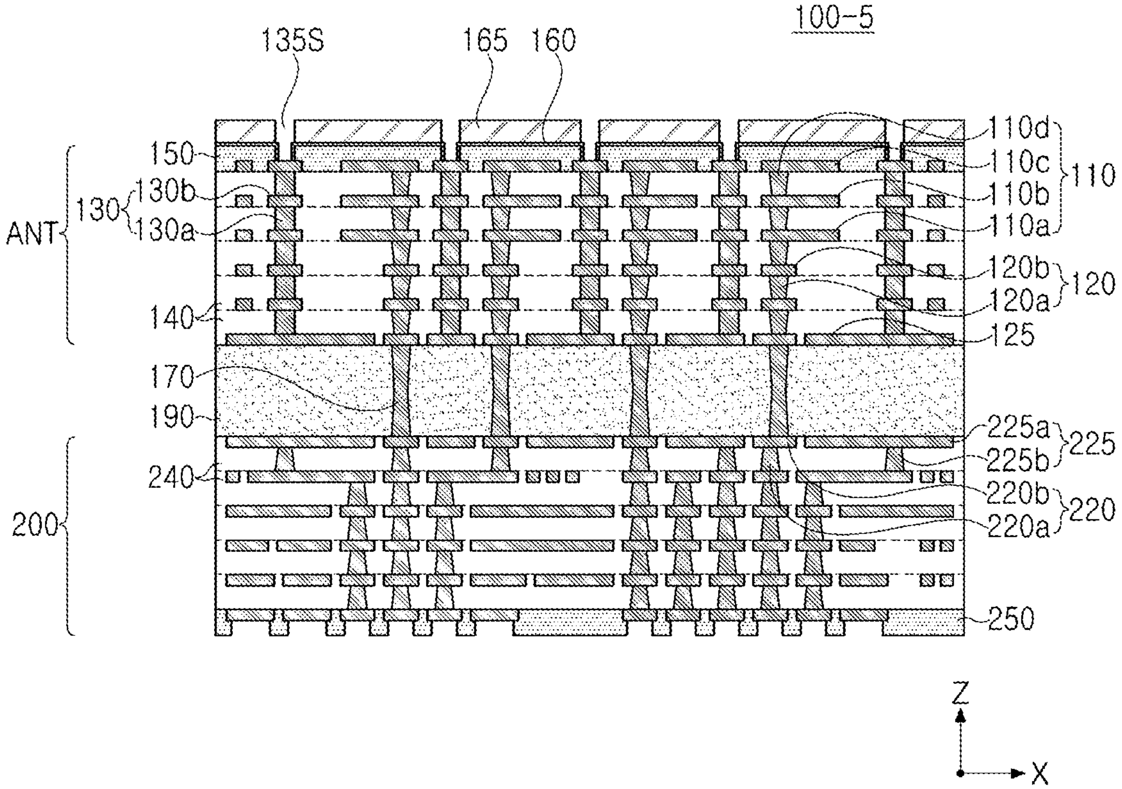

Referring to FIG. 5E, the antenna substrate of the fifth operation 100-5 may include a structure in which a portion of the photosensitive film 165 is removed. For example, a portion of the photosensitive film 165 may be removed using a photolithography method.

Figure 5F:
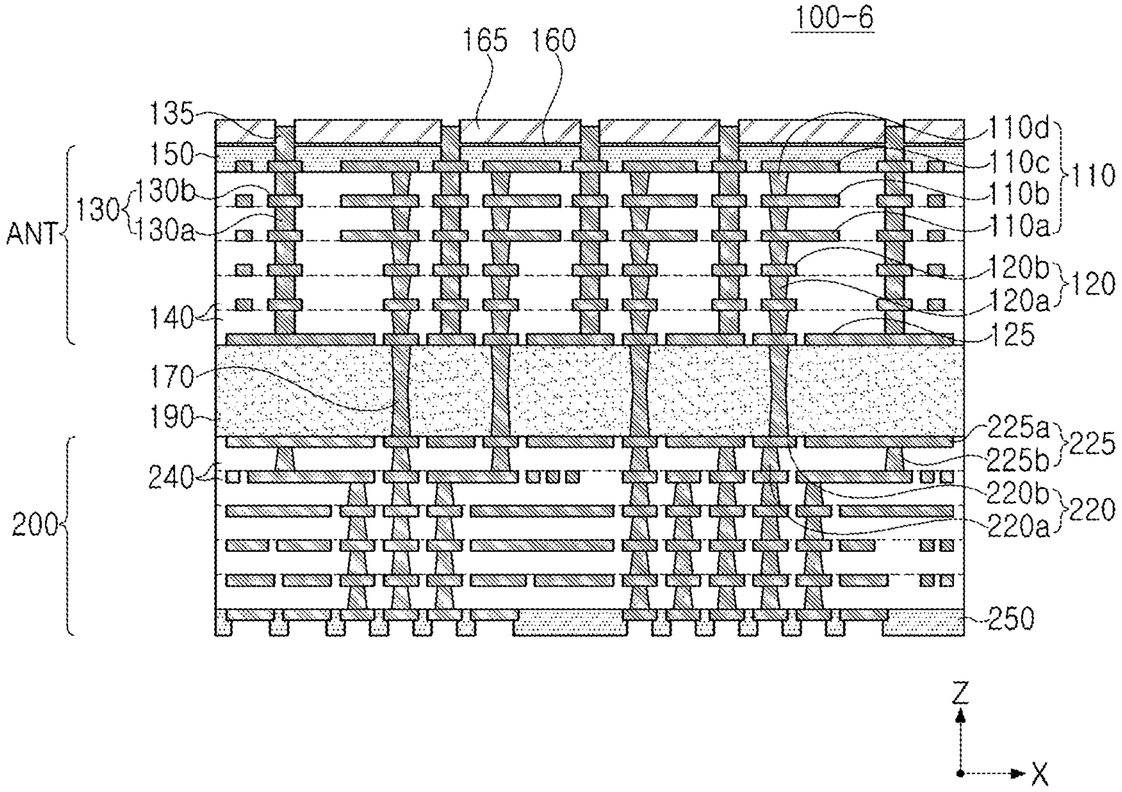

Referring to FIG. 5F, the antenna substrate of the sixth operation 100-6 may include a structure in which the shielding post 135 is formed in a portion removed from the photosensitive film 165. For example, the shielding post 135 may be formed by plating on a portion of the plating layer 160 based on the seed of the plating layer 160.

Figure 5G:
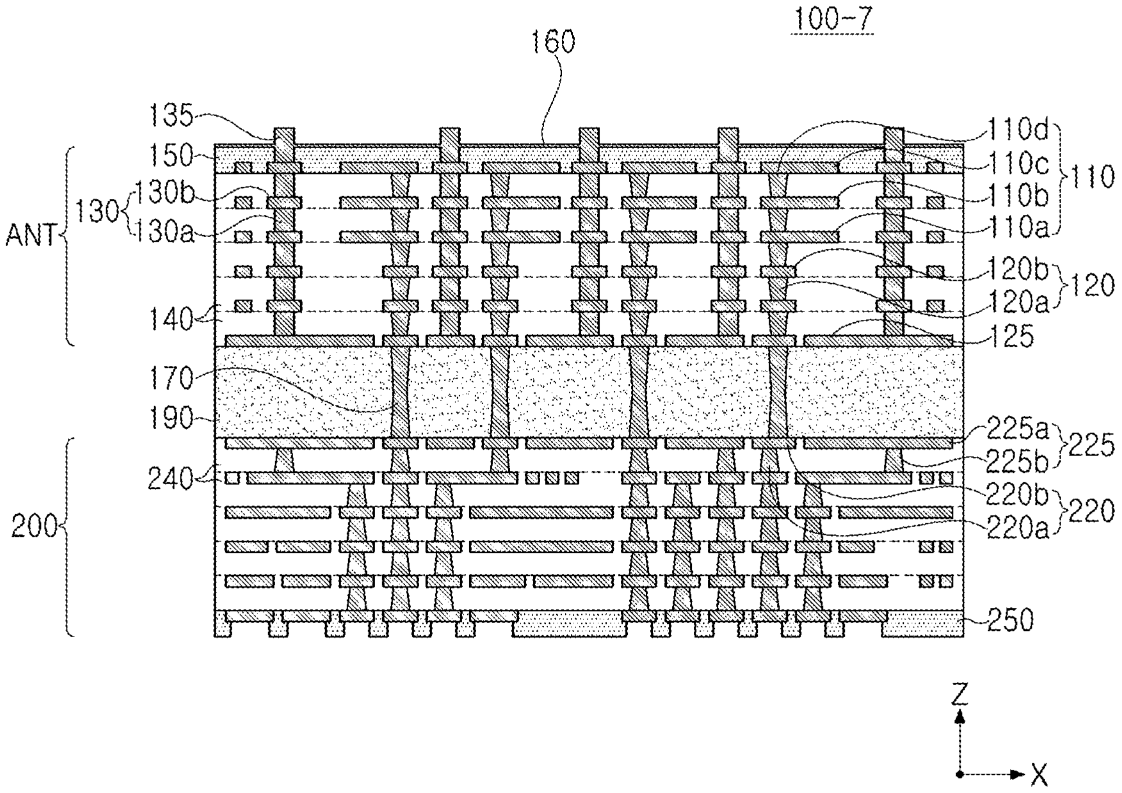

Referring to FIG. 5G, the antenna substrate of the seventh operation 100-7 may include a structure in which the photosensitive film 165 is removed. Thereafter, at least a portion of the plating layer 160 may also be removed.

As set forth above, since the antenna substrate according to an embodiment may effectively reduce electromagnetic interference between a plurality of patch antennas, a gain and/or a maximum output may be efficiently increased.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna substrate comprising:

a skin layer containing an insulating material;

a ground layer containing a conductive material;

an insulating layer disposed between the skin layer and the ground layer and including an insulating material different from the insulating material of the skin layer;

a plurality of patch antennas disposed between the ground layer and the skin layer;

a shielding member disposed between the ground layer and the skin layer, spaced apart from the plurality of patch antennas, and connected to the ground layer; and a shielding post connected to the shielding member, and protruding further than an outer surface of the skin layer, from the shielding member in a direction facing the skin layer, at least a portion of the shielding post being disposed between the plurality of patch antennas.

2. The antenna substrate of claim 1, wherein a distance between the ground layer and an opposite surface of a surface of the shielding post facing the ground layer is greater than a distance between the ground layer and an opposite surface of a surface of the plurality of patch antennas facing the ground layer.

3. The antenna substrate of claim 1, wherein each of the plurality of patch antennas comprises a plurality of patch patterns disposed to overlap each other in a direction facing the ground layer, and a distance between the ground layer and an opposite surface of a surface of the shielding post facing the ground layer is greater than a distance between the ground layer and an opposite surface of a surface of a patch pattern facing the ground layer, the patch pattern being disposed farthest from the ground layer among the plurality of patch patterns.

4. The antenna substrate of claim 1, wherein as viewed in a direction in which the plurality of patch antennas and the ground layer face each other: the shielding post surrounds the plurality of respective patch antennas, and the shielding member surrounds the plurality of respective patch antennas.

5. The antenna substrate of claim 1, wherein in a direction in which the plurality of patch antennas face each other, a distance between the shielding post and the plurality of patch antennas is shorter than a length of each of the plurality of patch antennas.

6. The antenna substrate of claim 1, wherein a first width of the shielding post in a direction in which the plurality of patch antennas face each other and a second width perpendicular to the first width are different from each other.

7. The antenna substrate of claim 1, wherein the insulating material of the skin layer is closer to photosensitivity than the insulating material of the insulating layer, and the shielding post comprises copper (Cu).

8. The antenna substrate of claim 1, further comprising a plurality of feed vias disposed to penetrate through the ground layer and configured to feed the plurality of patch antennas.

9. The antenna substrate of claim 8, further comprising:

a wiring layer connected to the plurality of feed vias; and a core insulating layer disposed between the wiring layer and the ground layer and having a higher solidity than a solidity of the insulating layer.

10. The antenna substrate of claim 9, further comprising:

a Radio Frequency Integrated Circuit (RFIC) inputting or outputting a Radio Frequency (RF) signal to the wiring layer and converting a frequency of the RF signal, wherein the wiring layer is disposed between the ground layer and the RFIC.

11. The antenna substrate of claim 8, further comprising:

a wiring layer connected to the plurality of feed vias; and a solder member connected between the wiring layer and the plurality of feed vias and including a conductive material having a melting point lower than a melting point of the shielding post.

12. The antenna substrate of claim 1, wherein the skin layer is an outermost insulating layer of the printed circuit board, the shielding post protrudes from the skin layer, and a patch pattern, farthest from the ground layer among a plurality of patch patterns of one of the plurality of patch antennas, is covered by the skin layer.

13. An electronic device comprising:

the antenna substrate of claim 1; and a radio frequency integrated circuit (RFIC) inputting or outputting a radio frequency (RF) signal to the plurality of patch antennas of the antenna substrate.

14. An antenna substrate comprising:

a ground layer containing a conductive material;

a plurality of patch antennas disposed above the ground layer;

a shielding member spaced apart from the plurality of patch antennas, connected to the ground layer, and extending upwardly from the ground layer; and a shielding post protruding upwardly from the shielding member, wherein in a direction in which the plurality of patch antennas face each other, a distance between the shielding post and the plurality of patch antennas is shorter than a length of each of the plurality of patch antennas, and a distance between an upper surface of the shielding post and an upper surface of the ground layer is greater than a distance between upper surfaces of the plurality of patch antennas and the upper surface of the ground layer.

15. The antenna substrate of claim 14, wherein each of the plurality of patch antennas comprises a plurality of patch patterns disposed to overlap each other in a direction facing the ground layer, and the distance between the upper surface of the shielding post and the upper surface of the ground layer is greater than a distance between an upper surface of an uppermost patch pattern among the plurality of patch patterns and the upper surface of the ground layer.

16. The antenna substrate of claim 14, wherein at least a portion of the shielding post is disposed between the plurality of patch antennas.

17. The antenna substrate of claim 16, wherein as viewed in a direction in which the plurality of patch antennas and the ground layer face each other: the shielding post surrounds the plurality of respective patch antennas, and the shielding member surrounds the plurality of respective patch antennas.

18. The antenna substrate of claim 14, wherein a first width of the shielding post in a direction in which the plurality of patch antennas face each other and a second width perpendicular to the first width are different from each other.

19. The antenna substrate of claim 14, further comprising a plurality of feed vias disposed to penetrate through the ground layer and configured to feed the plurality of patch antennas.

20. The antenna substrate of claim 19, further comprising:

a wiring layer connected to the plurality of feed vias; and a radio frequency integrated circuit (RFIC) inputting or outputting a radio frequency (RF) signal to the wiring layer and converting a frequency of the RF signal, wherein the wiring layer is disposed between the ground layer and the RFIC.

21. An electronic device comprising:

the antenna substrate of claim 14; and a radio frequency integrated circuit (RFIC) inputting or outputting a radio frequency (RF) signal to the plurality of patch antennas of the antenna substrate.

* * * * *